US012525800B2

(12) United States Patent
Shaik et al.

(10) Patent No.: US 12,525,800 B2
(45) Date of Patent: Jan. 13, 2026

(54) SYSTEM AND METHOD FOR LOAD AND SOURCE FORECASTING FOR INCREASING ELECTRICAL GRID COMPONENT LONGEVITY

(71) Applicant: Eaton Intelligent Power Limited, Dublin (IE)

(72) Inventors: Fiaz Shaik, Pune (IN); Aaditya Kurde, Indore (IN); Sreejith Chakkalakkal, Malappuram (IN); Yigang Wang, Eden Prairie, MN (US)

(73) Assignee: Eaton Intelligent Power Limited, Dublin (IE)

( * ) Notice: Subject to any disclaimer, the term of this patent is extended or adjusted under 35 U.S.C. 154(b) by 589 days.

(21) Appl. No.: 17/785,261

(22) PCT Filed: Dec. 28, 2020

(86) PCT No.: PCT/EP2020/025599
§ 371 (c)(1),
(2) Date: Jun. 14, 2022

(87) PCT Pub. No.: WO2021/129955
PCT Pub. Date: Jul. 1, 2021

(65) Prior Publication Data
US 2022/0376499 A1 Nov. 24, 2022

Related U.S. Application Data

(60) Provisional application No. 62/954,070, filed on Dec. 27, 2019.

(51) Int. Cl.
*H02J 3/00* (2006.01)
*G05B 19/042* (2006.01)
(Continued)

(52) U.S. Cl.
CPC ............ *H02J 3/003* (2020.01); *G05B 19/042* (2013.01); *H02J 3/004* (2020.01); *H02J 3/381* (2013.01);
(Continued)

(58) Field of Classification Search
CPC .................................. H02J 3/003; H02J 3/004
See application file for complete search history.

(56) References Cited

U.S. PATENT DOCUMENTS 10,540,422 B2 * 1/2020 Yuan ...................... G06N 20/00
2015/0112496 A1 4/2015 Fisher et al.
(Continued)

OTHER PUBLICATIONS

Eva Hopper, European International Searching Authority, International Search Report and Written Opinion, counterpart PCT Application No. PCT/EP2020/025599, mailed Apr. 29, 2021, 12 pages total.

*Primary Examiner* — Mark A Connolly
(74) *Attorney, Agent, or Firm* — DiBerardino McGovern IP Group LLC

(57) ABSTRACT

A system and method for optimizing power grid operations and enhancing the life of switching components therein is provided. Current meteorological information of a region of operation of the power grid is collected during operation thereof, along with historical meteorological data of the region. A plurality of prediction models are executed using the current meteorological information and/or the historical meteorological data and a meteorological parameter of the region is forecast by selectively combining outputs of at least some of the executed prediction models, the meteorological parameter being a parameter that causes a renewable energy source in the power grid to generate power. The forecasted meteorological parameter is compensated with physical models and the historical meteorological data, and optimal switching operations of switching components in
(Continued)

the power grid are computed based on the compensated forecasted meteorological parameter, with the switching components being controlled based on the computed optimal switching operations.

22 Claims, 4 Drawing Sheets

(51) Int. Cl.
*H02J 3/38* (2006.01)
*H02J 3/32* (2006.01)
*H02J 13/00* (2006.01)

(52) U.S. Cl.
CPC ........... *H02J 3/32* (2013.01); *H02J 13/00022* (2020.01); *H02J 2203/20* (2020.01); *H02J 2300/24* (2020.01)

(56) References Cited

U.S. PATENT DOCUMENTS

| | | | |
|---|---|---|---|
| 2015/0347922 A1* | 12/2015 | Hamann | ................ G06N 20/00 706/12 |
| 2019/0036340 A1 | 1/2019 | Meeker et al. | |
| 2019/0064392 A1 | 2/2019 | Feng et al. | |
| 2019/0370693 A1 | 12/2019 | Franklin, Jr. et al. | |
| 2020/0057175 A1* | 2/2020 | Zhang | .................... H02J 3/004 |
| 2022/0209531 A1* | 6/2022 | Sadot | .................... G06Q 10/06 |

\* cited by examiner

SYSTEM AND METHOD FOR LOAD AND SOURCE FORECASTING FOR INCREASING ELECTRICAL GRID COMPONENT LONGEVITY

BACKGROUND OF THE INVENTION

The present invention relates generally to electrical grids and associated equipment and, more particularly, to a system and method for forecasting load and source variability in an electrical grid in order to increase the longevity of electrical grid equipment using a multi-dimensional risk assessment.

A power distribution system/network or electrical grid/network ordinarily requires many components or assets to supply and transmit electrical power to loads that are connected to the power system. A power system may include, for example, generators, power stations, transmission systems, and distribution systems. Generators and power stations supply electrical power to transmission systems, which then transmit the electrical power to distribution systems. Distribution systems deliver the electrical power to loads such as, for example, residential, commercial, and industrial buildings. The necessary components or equipment to operate the transmission and distribution systems may include, for example, transformers, load tap changers (LTCs), circuit breakers, relays, reclosers, capacitor banks, buses, and transmission lines. Those components can be quite expensive to replace, especially in a large power system with thousands of those components.

Power distribution systems/networks as described above increasingly receive/generate at least some portion of their power from renewable energy sources, including photovoltaic (PV) and wind turbine systems for example. It is recognized that the power output from such renewable energy sources to the grid is intermittent and highly variable, and that this intermittence/variability adds complexity and uncertainty to the grid. For example, voltage variable maintenance elements like LTCs and capacitor banks need to be operated more frequently and abruptly to maintain requisite power factor and voltage profiles due to the intermittence/variability of the power generated by these renewable energy sources. The result of such increased and abrupt operation is a reduced lifetime for LTCs and capacitor banks owing to the increased switching operations, which over time leads to more frequent replacement of such elements and an increase in operating/maintenance costs for utility companies.

It would therefore be desirable to provide a system and method for efficiently predicting or estimating, with good accuracy, the expected power provided by renewable energy sources in advance, in order to optimize the LTC and capacitor bank switching, thereby increasing their operating lifetime and enhancing the grid operation.

BRIEF DESCRIPTION OF THE INVENTION

Embodiments of the present invention provide a system and method for forecasting load and source variability in an electrical grid in order to optimize operations of electrical grid equipment.

In accordance with one aspect of the invention, a method of optimizing power grid operations and enhancing the life of switching components in a power grid that includes a renewable energy source is provided, with the method performed by a prediction and optimization system. The method includes collecting current meteorological information of a region of operation of the power grid during operation of the power grid, along with historical meteorological data of the region. The method also includes executing a plurality of prediction models using at least one of the current meteorological information and historical meteorological data and forecasting a meteorological parameter of the region by selectively combining outputs of at least some of the plurality of executed prediction models, the meteorological parameter causing the renewable energy source to generate power. The method further includes compensating the forecasted meteorological parameter with physical models and the historical meteorological data, computing optimal switching operations of the switching components based on the compensated forecasted meteorological parameter, and controlling the switching components of the power grid based on the computed optimal switching operations.

In accordance with another aspect of the invention, a power system includes a renewable energy source configured to generate power responsive to acting thereon of a meteorological parameter, a power grid coupled to the grid, and a plurality of switching components coupled between the renewable energy source and the power grid to selectively control and condition a flow of power from the renewable energy source to the power grid. The power system also includes a prediction and optimization system configured to optimize power grid operations and enhance a life of the switching components through meteorological parameter forecasting. The prediction and optimization system includes a processor configured to execute a collecting module for collecting meteorological information of a region of operation of the power grid and historical meteorological data of the region, an executing engine for executing a plurality of prediction models using at least one of the meteorological information and the historical meteorological data, and a forecasting module for forecasting a meteorological parameter of the region that causes the renewable power source to generate power, the meteorological parameter being forecast by selectively combining outputs of at least some of the plurality of executed prediction models. The processor is further configured to execute a compensating module for compensating the forecasted meteorological parameter with physical models and the historical meteorological data, a computing and optimization module for computing optimal switching operations of the switching components based on the compensated forecasted meteorological parameter, and a controlling module for controlling the switching components of the power grid based on the computed optimal switching operations.

In accordance with yet another aspect of the invention, a system for optimizing power grid operations and longevity in a power grid including a renewable energy source and voltage-ampere reactive (VAR) compensation devices, through meteorological forecasting, is provided. The system includes a computer readable storage medium having computer readable code stored thereon that, when executed by a processor, causes the processor to collect meteorological information of a region of operation of the power grid, along with historical meteorological data of the region and execute a Integrated Volt/VAR Control (IVVC) algorithm using at least one of the meteorological information and the historical meteorological data, the IVVC algorithm executing a plurality of prediction models. The computer readable code stored on the computer readable storage medium, when executed by the processor, also causes the processor to forecast a meteorological parameter of the region that causes the renewable power source to generate power based on the IVVC algorithm, compute optimal switching operations in the VAR compensation devices based on the forecasted meteorological parameter, and control switching in the VAR compensation devices based on the computed optimal switching operations.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a system and method for forecasting load and source variability in an electrical grid in order to optimize operations of electrical grid equipment, including increasing the longevity of electrical grid equipment and/or maximizing operational efficiency of electrical grid equipment. The systems and methods may predict an amount of power output that is likely to be generated by one or more renewable energy sources (such as photovoltaic (PV) arrays or wind turbines) and/or power input that is to be required by a load in one or more upcoming time periods, and perform at least one action for controlling the system based on the predicted power output and load requirements. Such actions can include controlling switching in voltage-ampere reactive (VAR) compensation devices, such as LTCs and capacitor banks, thereby increasing their operating lifetime and enhancing the grid operation.

While embodiments of the invention are described here below with regard to predicting an amount of power output that is likely to be generated by renewable energy sources in the form of PV arrays, based on measured and historical solar irradiance data and the like, it is recognized embodiments of the invention also encompass other forms of renewable energy sources, including wind turbines for example. Accordingly, embodiments of the invention are understood as not being limited by the specific embodiments discussed here below.

Figure 1:
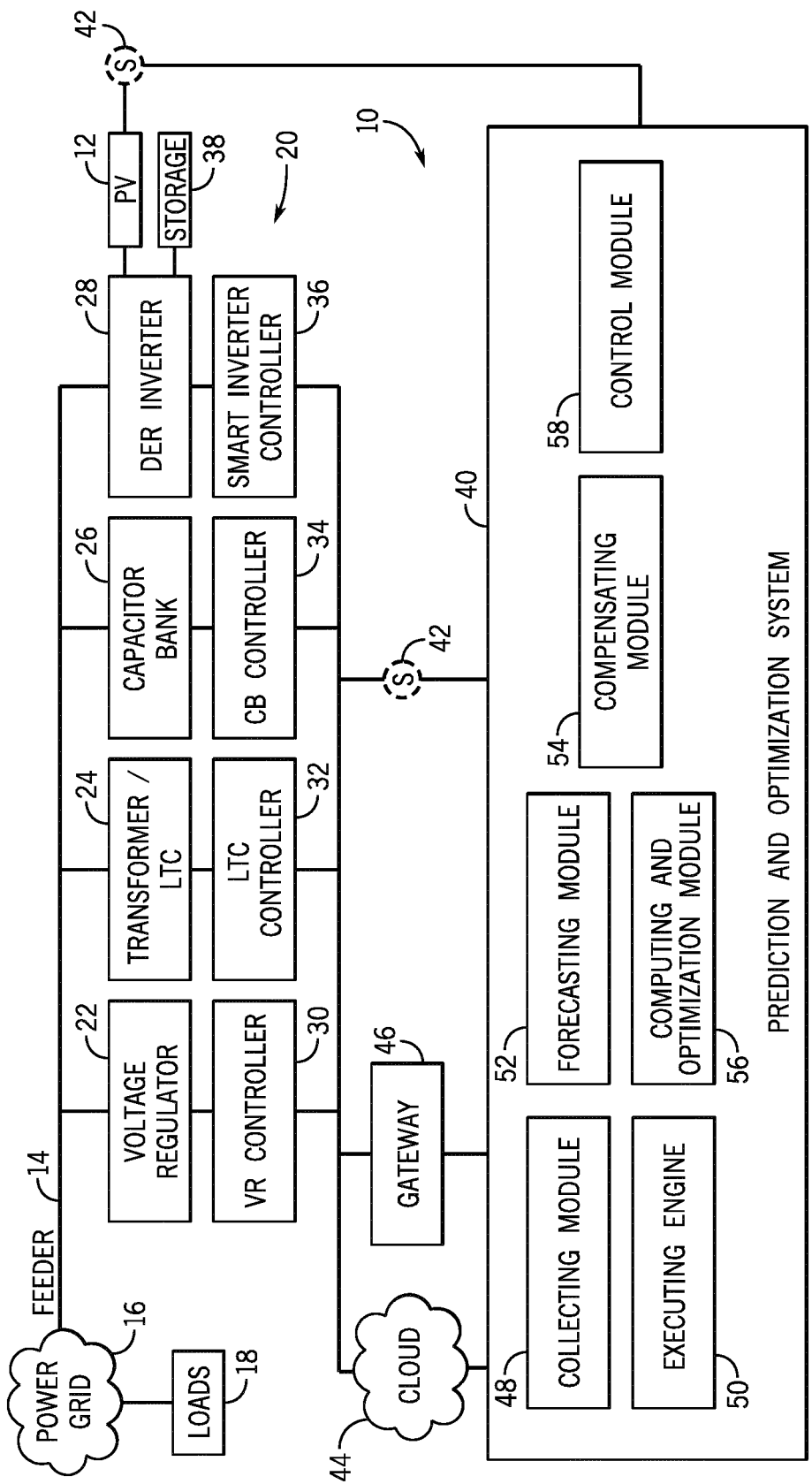
FIG. 1 is a diagram of a power distribution system that includes a prediction and optimization system, according to an embodiment of the invention.

Referring now to FIG. 1, an example architecture of a power distribution system or network 10 is illustrated, according to an embodiment of the invention. The power system 10 includes a renewable energy source 12 that may produce electric power and may deliver the electric power along one or more power lines or feeders 14 to an electric power grid 16 and associated loads 18 connected thereto, such as residential, commercial, and industrial buildings. According to one embodiment, and as shown in FIG. 1, the renewable energy source 12 is in the form of one or more PV arrays that produce electric power responsive to the receiving of solar irradiance, but it is recognized that the renewable energy source 12 may be of a different type—including but not limited to wind turbines, for example.

As shown in FIG. 1, positioned along the feeder(s) 14 between the renewable energy source 12 and the electrical grid 16 is electrical grid equipment 20 that functions to control power flow therebetween and condition the power output by the renewable energy source 12. The equipment 20 may comprise various voltage-ampere reactive (VAR) compensation or maintenance devices, including (but not limited to) a voltage regulator 22, transformer (and associated LTC) 24, capacitor bank 26, and distributed energy resource (DER) inverter 28, as illustrated in FIG. 1, and/or may additionally or alternatively include other known power converters, power electronic components, and electromechanical or solid-state switching devices. The equipment 20 may also include a controller for each of the VAR compensation devices 22-28, with a voltage regulator controller 30, LTC controller 32, capacitor bank controller 34, and smart inverter controller 36, as illustrated in FIG. 1.

In operation, the VAR compensation devices 22-28 provide fast-acting reactive power by regulating voltage, power factor, and harmonics, thereby stabilizing operation of the power system 10. If the power system's reactive load is capacitive (leading), one or more of the VAR compensation devices 22-28 will operate to consume VARs from the system 10, thereby lowering the system voltage. Under inductive (lagging) conditions, one or more of the VAR compensation devices 22-28 (e.g., the capacitor bank 26) are automatically switched in, thus providing a higher system voltage. In operation of the VAR compensation devices 22-28 with the renewable energy source 12, it is recognized that the power output from the renewable energy source 12 to the grid 16 is intermittent and highly variable. Accordingly, the VAR compensation devices 22-28 need to be operated more frequently and abruptly to maintain requisite power factor and voltage profiles due to the intermittence/variability of the power generated by the renewable energy source 12.

According to one embodiment, some or all of the power generated by renewable energy source 12 may be provided to a power storage 38 included in the power system 10. For example, the power storage 38 may include one or more batteries or other power storage devices able to receive and store the electric power when the electric power is delivered to the power storage 38. In some cases, the power storage 38 (e.g., batteries) may be discharged to the power grid 16, such as to compensate for a deficit in meeting a desired or intended power output to the power grid 16.

Referring still to FIG. 1, power system 10 further includes a prediction and optimization system 40 that operates to forecast load and source variability in the power system 10 in order to optimize operations of the electrical grid equipment 20, with the prediction and optimization system 40 providing commands to the various controllers 30-36 for controlling the electrical grid equipment 20 in accordance with such optimization. The prediction and optimization system 40 may gather real-time data and historical data on the meteorological information of a region of operation of the power grid 16 and renewable energy source 12—using sensors 42 incorporated in the power system 10 and/or by referencing historical databases (stored in an external database or cloud network, indicated at 44), for example—in order to provide for forecasting of the load and source variability in the power system 10 and optimizing operations of the electrical grid equipment 20. Commands from the prediction and optimization system 40 may be transferred to the controllers 30-36 via a gateway 46.

In an exemplary embodiment, and as shown in FIG. 1, the prediction and optimization system 40 comprises a collecting module 48, executing engine 50, forecasting module 52, compensating module 54, computing and optimization module 56, and control module 58—with the modules and executing engine(s) being provided on a computer readable medium (such as in the form of computer readable code stored thereon) and processor (that executes such code/modules) of the system 40 to provide for forecasting of the load and source variability in the power system 10 and optimizing of the operations of the VAR compensation devices 22-28. Operation of the modules and executing engine(s) 48-58 is described in greater detail here below according to an exemplary embodiment where the renewable energy source 12 is in the form of a PV array, although it is recognized that the modules and executing engine(s) 48-58 could be programmed/configured for use with other renewable energy sources, such as wind turbines, for example.

According to an exemplary embodiment, the collecting module 48 is configured to collect meteorological information of a region of operation of the power grid 16/PV array 12, historical data of observed solar irradiance of the region, and extraterrestrial solar irradiance of the region. The executing engine 50 is configured to execute a plurality of prediction models using at least one of the meteorological information, historical observed solar irradiance, and the extraterrestrial solar irradiance. The forecasting module 52 is configured to forecast solar irradiance of the region by selectively combining the output of at least one of the executed models. The compensating module 54 is configured to compensate the forecasted solar irradiance with physical models (of the power system and/or region) and the historical data. The computing and optimization module 56 is configured to compute optimal switching operations of the switching components based on the compensated forecasted solar irradiance. The controlling module 58 is configured to control the switching components of the power grid based on the computed optimal switching operations.

According to embodiments of the invention, the prediction and optimization system 40 executes a plurality of prediction models to provide an output that enables the forecasting of solar irradiance, with the forecasted solar irradiance being compensated and subsequently utilized to compute optimal switching operations in the VAR compensation devices. Optimization of the switching operations in the VAR compensation devices 22-28 is achieved via performing of an Integrated Volt/VAR Control (IVVC) algorithm by the prediction and optimization system 40, which may be a dynamic programing (DP)-based IVVC algorithm or other suitable IVVC algorithm, according to embodiments. Operation/switching of the VAR compensation devices 22-28 according to the optimal switching operations provides for optimization of the power grid 10 by increasing power quality and power system efficiency, such as by maintaining a specified voltage profile and power factor. Operation/switching of the VAR compensation devices 22-28 according to the optimal switching operations also increases the operating lifetime of the VAR compensation devices 22-28, as the switching frequency in the devices is reduced/minimized.

Figure 2:
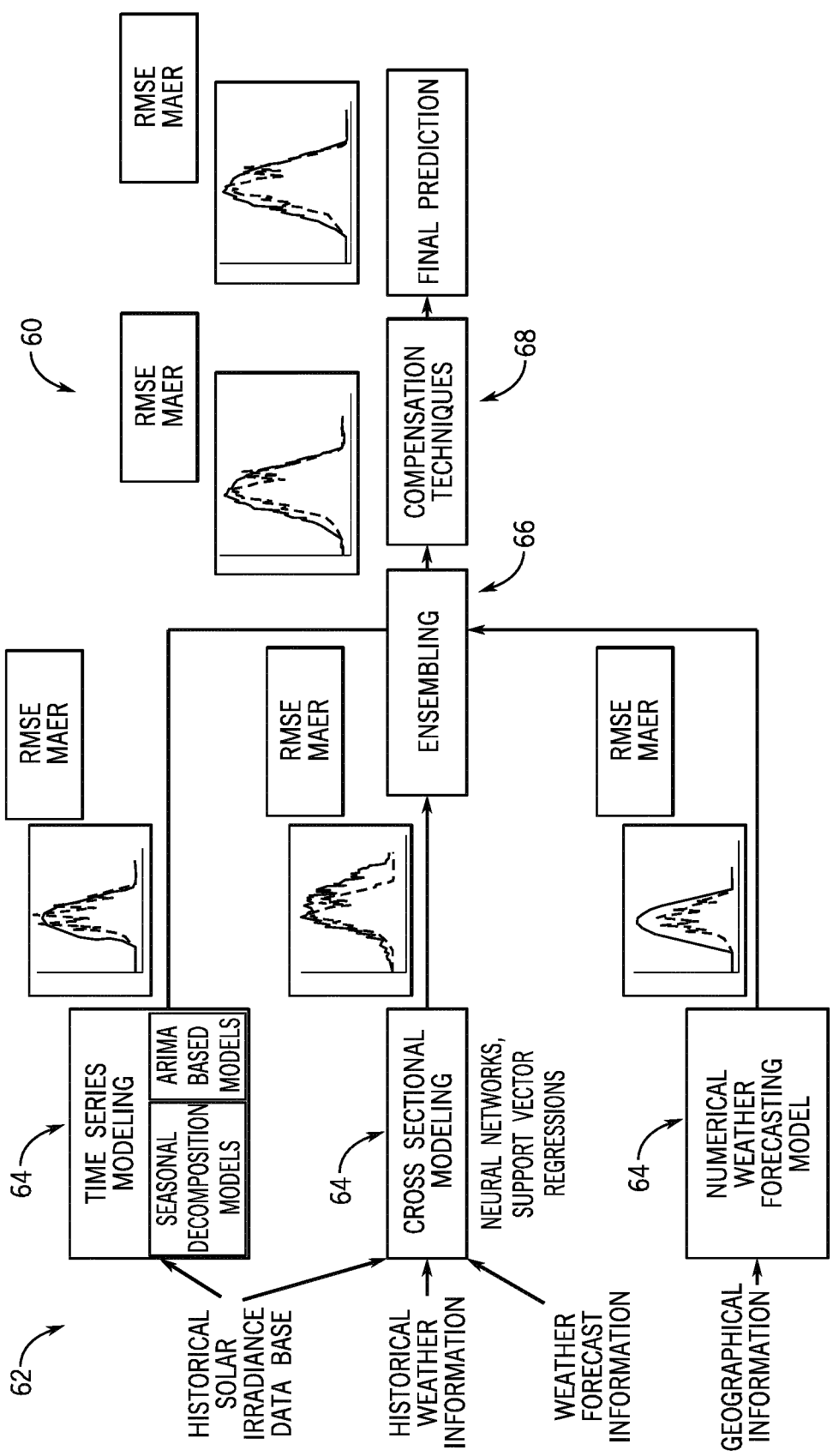
FIG. 2 is a block diagram of a source power prediction algorithm implemented by the prediction and optimization system of FIG. 1, according to an embodiment of the invention.

Referring now to FIG. 2, and also with continued reference to FIG. 1, a block diagram is provided illustrating a source power prediction algorithm 60 executed by the prediction and optimization system 40, according to an embodiment of the invention. The prediction algorithm 60 is run by the collecting module 48, executing engine 50, forecasting module 52, and compensating module 54—with a final prediction output from the algorithm and provided to the computing and control modules 56, 58 to determine and implement an optimized switching pattern or control scheme for operation of the VAR compensation devices 22-28. While the source power prediction algorithm 60 is described here below with regard to predicting solar irradiance for purposes of predicting source power generated by the renewable energy source 12, it is recognized that other variables affecting source power generation could be predicted, such as the speed and duration of winds that would drive a wind turbine, for example.

As shown in FIG. 2, inputs 62 are provided to the algorithm 60 (such as by operation of collecting module 48) in the form of: geographical information, meteorological/weather forecast information of the geographic region in which the power system operates, historical meteorological/weather information data of the geographic region in which the power system operates, and historical observed solar irradiance of the region (including extraterrestrial solar irradiance of the region). In one embodiment, the meteorological/weather information includes relative humidity, wind speed, station atmospheric pressure, air temperature, and precipitation of the region, while the extra-terrestrial solar irradiance is calculated using solar astronomical data and location co-ordinates of the region. According to embodiments of the invention, the inputs may be acquired via sensors 42 incorporated in the power system 10 (that acquire data from the renewable energy source, such as measured solar irradiance, etc.) and/or by referencing external databases (e.g., cloud network) that provide weather forecast data and historical weather and solar irradiance information.

The inputs 62 are provided to one or more models 64 that use the input data to each generate a predicted forecast of solar irradiance of the region, which would therefore provide a corresponding source power output from the PV array. According to embodiments of the invention, the prediction models employed may include modeling types that may be broadly categorized as time series modeling, cross-sectional modeling, and numerical weather forecasting modeling. Such modeling types may specifically utilize/employ an auto regressive moving average (ARMA) model, auto retrogressive integrating moving average (ARIMA) model, seasonal and trend decomposition (STL) model, linear regression model, exponential regression model, artificial neural network (ANN) model, numerical weather forecasting model (NWF), support vector machine (SVM) regression model, deep learning model, solar positioning model, naïve prediction model, or the like. For example, the power prediction algorithm may employ an SVM regression model as a machine learning technique for predicting the power output for the renewable energy source. The SVM regression model may provide highly predictive accuracy, as well as efficient model construction and execution to enable the prediction modeling and analytics to be executed on inexpensive edge computing devices with limited computational resources. The SVM regression model is also able to easily accommodate large numbers of predictors with minimal chance of overfitting due to its built-in regularization mechanism for handling high dimensional model inputs. In general, the specific prediction models employed in the source power prediction algorithm may be chosen based on a prediction horizon/timeframe, a desired accuracy, and a desired computational time.

In the prediction algorithm 60 illustrated in FIG. 2, historical solar irradiance data is provided to a time series model (such as a seasonal decomposition model or ARMA-based model) and to a cross-sectional model (such as a neural network or SVM regression model). Historical weather information and meteorological/weather forecast information are provided to a cross-sectional model (such as a neural network or SVM regression model). Geographical information is provided to a numerical weather forecasting model. The inputs 62 are analyzed by each of the respective predictive models to generate a solar irradiance and corresponding source power prediction, with it being recognized that the accuracy of the source power predictions generated by the models will vary depending on the model used and the inputs analyzed thereby.

Upon generation of the source power predictions by the predictive models, the predictions are collectively analyzed via performing of an ensembling technique, indicated at 66. Via performing of such ensembling, the separate source power predictions generated by the related but distinct predictive models are combined and synthesized into a single score or spread in order to improve the accuracy of the predictive models in predicting the source power over a desired horizon. That is, it is recognized that the source power prediction output from a single predictive model (based on one specific data sample or set) can have biases, high variability, or outright inaccuracies that affect the reliability of its analytical findings and, that by combining the source power prediction from different models (that may analyze different samples/data), the effects of those limitations can be reduced and the accuracy of the predictive models can be increased/improved. For example, the root mean square error (RMSE) and mean absolute error rate (MAER) values for the solar irradiance (source power) prediction derived after the ensembling step would be improved as compared to the RMSE and MAER values associated with the individual predictive models 64, as it is recognized, for example, that a given time series modeling may have higher RMSE compared to a cross-sectional modeling at one particular time/day, but that it might be reversed at another particular time/day—and thus ensembling helps to account for such variability.

Upon the ensembling of the different model predictions, the algorithm 60 performs an additional compensation on the solar irradiance and corresponding source power prediction, as indicated at 68. That is, the predicted solar irradiance output from the ensembling step is compensated with physical models (of the power system and/or region) and historical data, in order to further increase the accuracy of the predicted solar irradiance and corresponding source power output. The compensation step further reduces/improves the RMSE and MAER values (for example) of the predicted solar irradiance and corresponding source power output, in order to provide a final prediction of the expected power provided by the PV array (or other renewable energy source) having increased accuracy as compared to previous predictive techniques.

Figure 3:
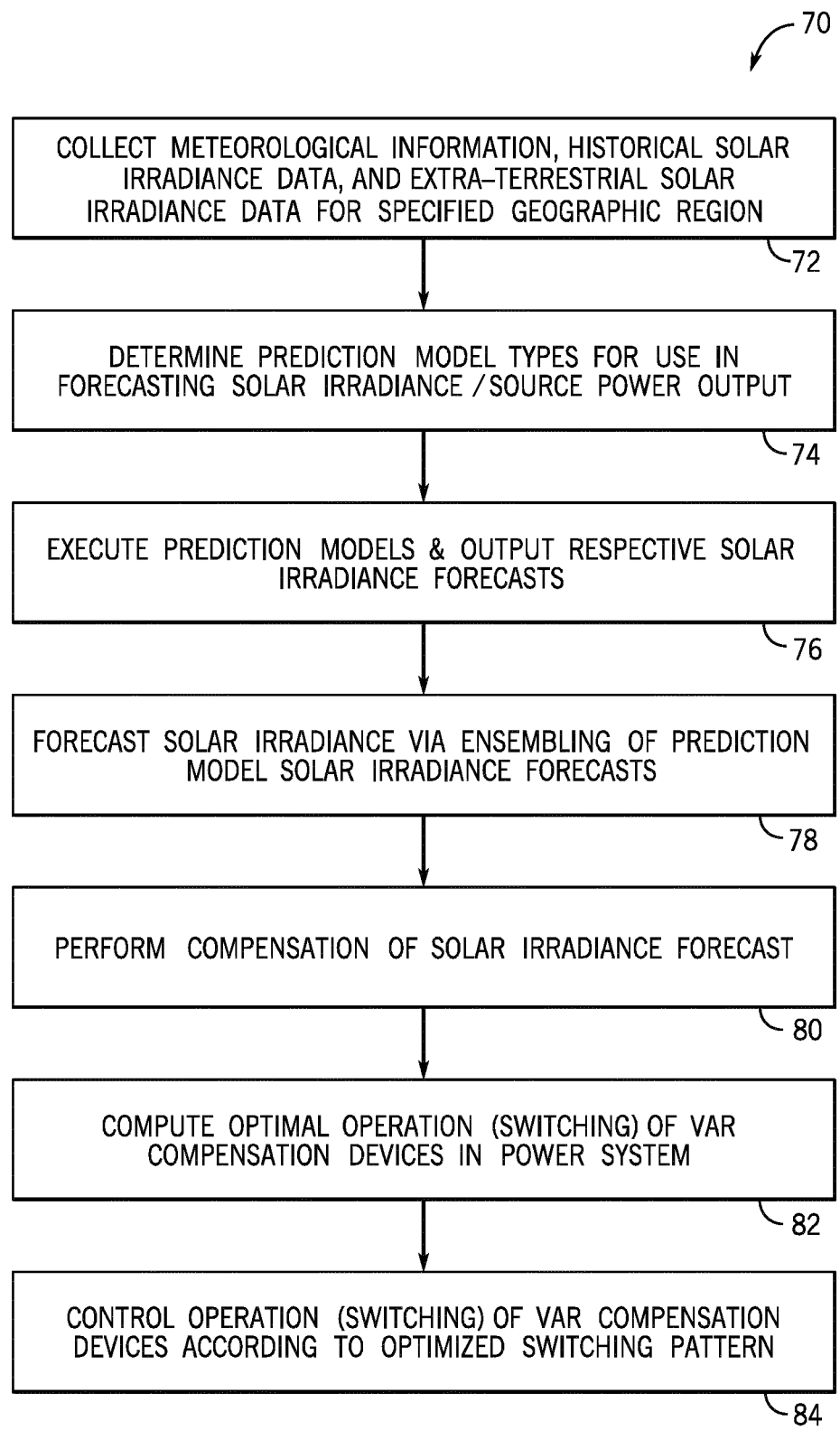
FIG. 3 is a flow chart illustrating a technique for forecasting load and source variability in an electrical grid and optimizing operations of electrical grid equipment responsive thereto, according to an embodiment of the invention.

Referring now to FIG. 3, and with reference back to FIG. 1, a flow chart illustrating a technique 70 for forecasting load and source variability in an electrical grid power system and optimizing operations of electrical grid equipment responsive thereto is shown, according to an embodiment of the invention. The technique 70 may be performed by the prediction and optimization system 40 and controllers 30-36 shown in FIG. 1, in order to control operation of VAR compensation devices 22-28 of a power system 10. In the embodiment of technique 70 described here below, the technique is specific to a power system that includes one or more PV arrays as the renewable energy source of the system—with solar irradiance and other associated meteorological parameters that affect power generation of the PV array(s) being measured/predicted, but it is recognized that the technique could also be implemented with a power system having another alterative renewable energy source, such as wind turbines. In such an embodiment, other meteorological parameters may be measured/predicted as appropriate—and thus it is recognized that technique 70 is not limited to the specific embodiment described here below.

As shown in FIG. 3, the technique 70 begins at STEP 72 where meteorological information of a region of operation of the power grid, historical data of observed solar irradiance of the region, and extra-terrestrial solar irradiance of the region are collected and provided as "inputs" for further processing (such as to collecting module 48). The meteorological information may, according to one embodiment, include relative humidity, wind speed, station atmospheric pressure, air temperature, and precipitation of the region, although additional/alternative meteorological information may also be acquired. The meteorological information, historical data of observed solar irradiance of the region, and extra-terrestrial solar irradiance may be acquired via sensors 42 incorporated in the power system 10 (that acquire meteorological data and solar irradiance/extra-terrestrial solar irradiance data) and/or by referencing external databases (e.g., cloud network) that provide historical weather data and historical weather data and historical data of observed solar irradiance, with the acquired inputs provided to the collecting module 48.

Upon collection of the inputs described above, the technique 70 continues at STEP 74 by determining the type of prediction models to use in implementing the technique. The determination of the type of prediction models to use may be based on at least one of a prediction horizon, required accuracy, or computational time restraint for generating the prediction. That is, it is recognized that certain predictive models may work better for shorter/longer prediction horizons, may provide greater accuracy, and/or may be more or less computationally intensive. According to embodiments of the invention, the prediction models employed may include modeling types that may be broadly categorized as time series modeling, cross-sectional modeling, and numerical weather forecasting modeling. Such modeling types may specifically utilize/employ an auto regressive moving average (ARMA) model, auto retrogressive integrating moving average (ARIMA) model, seasonal and trend decomposition (STL) model, linear regression model, exponential regression model, artificial neural network (ANN) model, numerical weather forecasting model (NWF), support vector machine (SVM) regression model, deep learning model, solar positioning model, naïve prediction model, or the like.

Upon selection of desired prediction models to be used in the technique 70, the selected prediction models are executed at STEP 76 (such as by executing engine 50) using at least one of the meteorological information, historical observed solar irradiance, and the extra-terrestrial solar irradiance. As an example, historical solar irradiance data is provided to a time series model (such as a seasonal decomposition model or ARMA-based model) and to a cross-sectional model (such as a neural network or SVM regression model), while historical weather information and meteorological/weather forecast information are provided to a cross-sectional model (such as a neural network or SVM regression model) and geographical information is provided to a numerical weather forecasting model. The inputs are analyzed by each of the respective predictive models to generate predicted values of the solar irradiance for the region and a corresponding source power prediction, which is output at STEP 76, with it being recognized that the accuracy of the source power predictions generated by the models will vary depending on the model used and the inputs analyzed thereby.

At STEP 78, the solar irradiance of the region is forecast (such as by forecasting module 52) by selectively combining the output of the executed models. According to an exemplary embodiment, the output of the executed models is combined via performing of an ensembling technique. The ensembling combines and synthesizes the separate solar irradiance predictions generated by the models into a single forecast in order to improve the accuracy of the solar irradiance forecast.

Upon ensembling of the solar irradiance predictions into a single solar irradiance forecast, compensation of the forecast is performed (such as by compensating module 54) at STEP 80 to further improve the accuracy of the solar irradiance forecast. According to an exemplary embodiment, the compensation of the solar irradiance forecast is performed by compensating the forecasted solar irradiance with physical models and historical solar irradiance data. The physical models and historical data may help to correct any errors or inaccuracies present in the predictive models and thereby output a compensated solar irradiance forecast having increased accuracy. For example, RMSE and MAER values of the forecast solar irradiance may be further minimized in the final prediction of the solar irradiance forecast output from STEP 80.

At STEP 82, the final (compensated) solar irradiance forecast is utilized to compute (such as by computing and optimization module 56) an optimal operation of the VAR compensation devices 22-28, i.e., optimal switching operations of one or more of the switching components in the VAR compensation devices 22-28—such as of the LTCs for transformer 24 and/or of switches associated with the capacitor bank 26. Optimization of the switching operations in the VAR compensation devices 22-28 is achieved via performing of an IVVC optimization technique, for example. According to one embodiment, IVVC uses a dynamic programing (DP)-based optimization technique to choose the right sequence of control actions ahead in time based on the predicted solar irradiance forecast. Accordingly, the total number of switching can be minimized and increased power quality and power system efficiency may be achieved Upon computing of the optimal switching operations of the switching components in the VAR compensation devices 22-28, the technique 70 continues at STEP 84—where the switching components in the VAR compensation devices 22-28 are controlled (such as by control module 58 and interaction thereof with one or more of controllers 30-36) based on the computed optimal switching operations. Operation/switching of the VAR compensation devices 22-28 according to the optimal switching operations provides for optimization of the power grid 10 by increasing power quality and power system efficiency, such as by maintaining a specified voltage profile and power factor. Operation/switching of the VAR compensation devices 22-28 according to the optimal switching operations also increases the operating lifetime of the VAR compensation devices 22-28, as the switching frequency in the devices is reduced/minimized.

Figure 4:
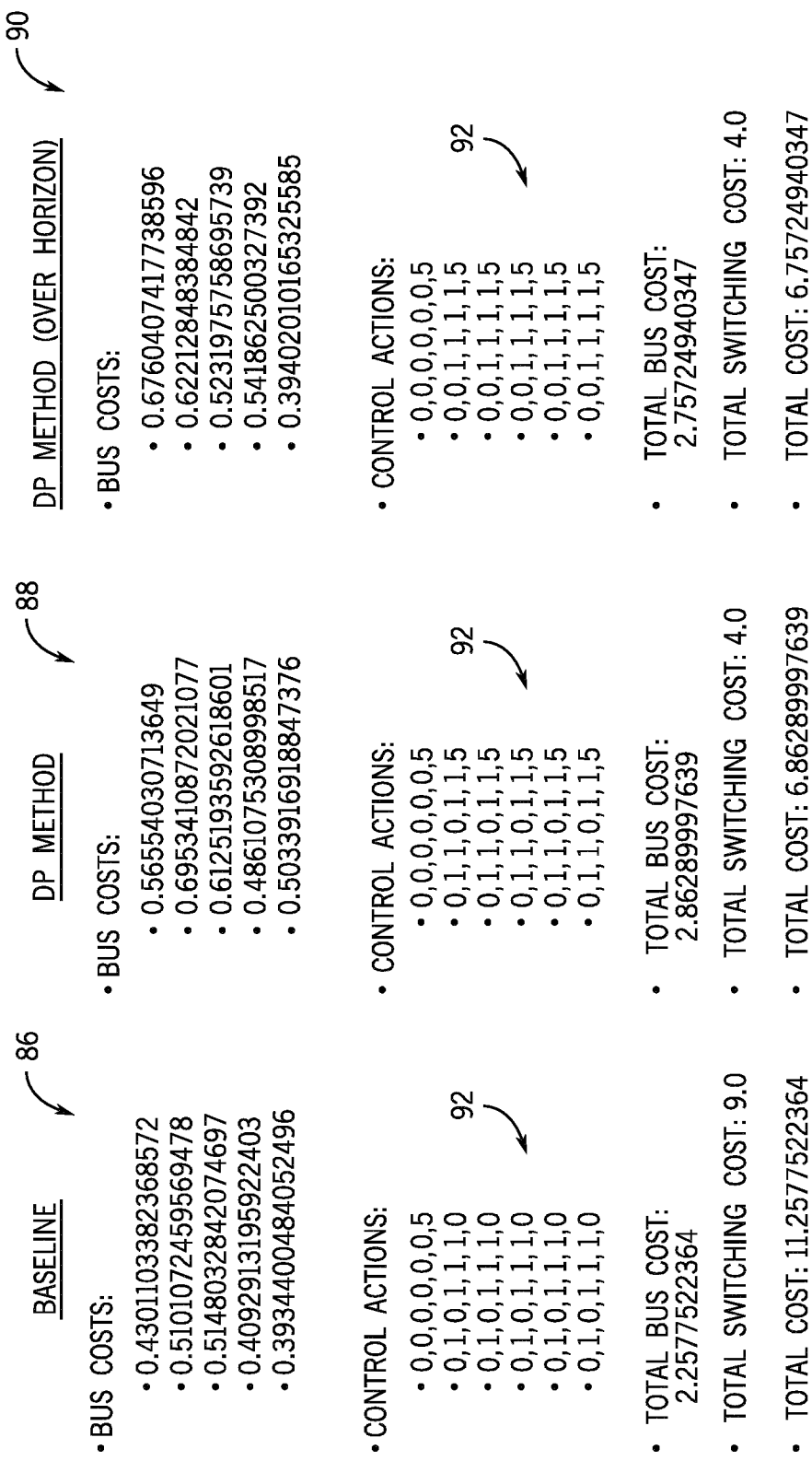
FIG. 4 is a diagram illustrating switching cost reductions achievable with embodiments of the invention.

Exemplary system efficiency and longevity gains resulting from the performing of technique 70 are illustrated in FIG. 4, in order to better understand the benefits of the present invention. FIG. 4 shows a comparison of bus costs and switching costs associated with operation of the power system according to a known baseline technique (indicated at 86), a DP-based IVVC optimization technique where forecasted source (and/or load) variability are used (indicated at 88), and a DP-based IVVC optimization technique where forecasted source (and/or load) variability are used for a specified time horizon (indicated at 90). As can be seen therein, the total switching cost is significantly reduced in the DP-based IVVC optimization techniques 88, 90 as compared to the baseline technique 86, with a total cost associated with operation of the power system also being significantly reduced in the DP-based IVVC optimization techniques 88, 90 as compared to the baseline technique 86.

In addition to the cost reductions in the power system achieved from implementation of a DP-based IVVC optimization technique 88, 90 (resulting from increased power quality and power system efficiency), the longevity of the power system (i.e., of the VAR compensation devices 22-28 therein, FIG. 1) can be increased due to the total amount of switching being reduced—which can be seen from the control action matrices 92 provided in FIG. 4. A switching reduction of 55% has been achieved via implementation of the DP-based IVVC optimization techniques 88, 90 as compared to the baseline technique 86.

Beneficially, embodiments of the invention thus provide a prediction and optimization system for predicting the expected power provided by renewable energy sources in advance, based on a level of forecast solar irradiance or other meteorological condition, in order to optimize the operation/switching of electrical grid equipment. An optimal switching pattern for VAR compensation devices, such as LTC and capacitor bank switching, can be determined based on such predictions to increase the operating lifetime of the VAR compensation devices and enhance the grid operation—such as by increasing power quality and power system efficiency.

Therefore, according to one embodiment of the present invention, a method of optimizing power grid operations and enhancing the life of switching components in a power grid that includes a renewable energy source is provided, with the method performed by a prediction and optimization system. The method includes collecting current meteorological information of a region of operation of the power grid during operation of the power grid, along with historical meteorological data of the region. The method also includes executing a plurality of prediction models using at least one of the current meteorological information and historical meteorological data and forecasting a meteorological parameter of the region by selectively combining outputs of at least some of the plurality of executed prediction models, the meteorological parameter causing the renewable energy source to generate power. The method further includes compensating the forecasted meteorological parameter with physical models and the historical meteorological data, computing optimal switching operations of the switching components based on the compensated forecasted meteorological parameter, and controlling the switching components of the power grid based on the computed optimal switching operations.

According to another embodiment of the present invention, a power system includes a renewable energy source configured to generate power responsive to acting thereon of a meteorological parameter, a power grid coupled to the grid, and a plurality of switching components coupled between the renewable energy source and the power grid to selectively control and condition a flow of power from the renewable energy source to the power grid. The power system also includes a prediction and optimization system configured to optimize power grid operations and enhance a life of the switching components through meteorological parameter forecasting. The prediction and optimization system includes a processor configured to execute a collecting module for collecting meteorological information of a region of operation of the power grid and historical meteorological data of the region, an executing engine for executing a plurality of prediction models using at least one of the meteorological information and the historical meteorological data, and a forecasting module for forecasting a meteorological parameter of the region that causes the renewable power source to generate power, the meteorological parameter being forecast by selectively combining outputs of at least some of the plurality of executed prediction models. The processor is further configured to execute a compensating module for compensating the forecasted meteorological parameter with physical models and the historical meteorological data, a computing and optimization module for computing optimal switching operations of the switching components based on the compensated forecasted meteorological parameter, and a controlling module for controlling the switching components of the power grid based on the computed optimal switching operations.

According to yet another embodiment of the present invention, a system for optimizing power grid operations and longevity in a power grid including a renewable energy source and voltage-ampere reactive (VAR) compensation devices, through meteorological forecasting, is provided. The system includes a computer readable storage medium having computer readable code stored thereon that, when executed by a processor, causes the processor to collect meteorological information of a region of operation of the power grid, along with historical meteorological data of the region and execute a Integrated Volt/VAR Control (IVVC) algorithm using at least one of the meteorological information and the historical meteorological data, the IVVC algorithm executing a plurality of prediction models. The computer readable code stored on the computer readable storage medium, when executed by the processor, also causes the processor to forecast a meteorological parameter of the region that causes the renewable power source to generate power based on the IVVC algorithm, compute optimal switching operations in the VAR compensation devices based on the forecasted meteorological parameter, and control switching in the VAR compensation devices based on the computed optimal switching operations.

The present invention has been described in terms of the preferred embodiment, and it is recognized that equivalents, alternatives, and modifications, aside from those expressly stated, are possible and within the scope of the appending claims.

What is claimed is:

1. A method comprising:
    collecting current meteorological information of a region of operation of a power grid during operation of the power grid, along with historical meteorological data of the region;
    executing a plurality of prediction models using the current meteorological information and the historical meteorological data;
    forecasting a meteorological parameter of the region by selectively combining outputs of at least some of the plurality of executed prediction models, the meteorological parameter causing a renewable energy source to generate power;
    computing optimal switching operations of one or more switching components of the power grid based on the forecasted meteorological parameter; and
    controlling the one or more switching components of the power grid based on the computed optimal switching operations.

2. The method of claim 1, wherein the one or more switching components of the power grid include one or more of: one or more load tap changers (LTC), one or more capacitor banks, one or more inverters, one or more converters, one or more solid state transformers, and one or more power electronic components.

3. The method of claim 1, wherein the plurality of prediction models include two or more of an auto regressive moving average (ARMA) model, auto retrogressive integrating moving average (ARIMA) model, seasonal and trend decomposition (STL) model, linear regression model, exponential regression model, artificial neural network model (ANN), numerical weather forecasting (NWF) model, support vector machine (SVM) model, deep learning model, solar positioning model, and naive prediction model.

4. The method of claim 1, further comprising optimizing the power grid to maintain a specified voltage profile and power factor.

5. The method of claim 1, wherein the current meteorological information includes one or more of relative humidity, wind speed, station atmospheric pressure, air temperature, and precipitation of the region.

6. The method of claim 1, wherein the renewable energy source comprises one or more photovoltaic (PV) arrays;
    wherein collecting the historical meteorological data comprises collecting historical data of observed solar irradiance of the region and extra-terrestrial solar irradiance of the region;
    wherein executing the plurality of prediction models comprises using at least one of the current meteorological information, the historical data of observed solar irradiance, and the extra-terrestrial solar irradiance;
    wherein forecasting the meteorological parameter comprises forecasting the solar irradiance of the region; and
    wherein computing the optimal switching operations comprises computing the optimal switching operations of the one or more switching components of the power grid based on the forecasted solar irradiance.

7. The method of claim 6, wherein the extra-terrestrial solar irradiance is calculated using solar astronomical data and location co-ordinates of the region.

8. The method of claim 1, further comprising determining a type of prediction models to use for the plurality of prediction models based on at least one of a prediction horizon of the forecasted meteorological parameter, a required accuracy of the forecasted meteorological parameter, or a computational time restraint for forecasting the meteorological parameter.

9. The method of claim 1, wherein forecasting the meteorological parameter of the region by selectively combining the output of the at least some of the plurality of executed prediction models comprises ensembling the outputs of the at least some of the plurality of executed prediction models.

10. The method of claim 1, further comprising predicting an expected power provided by the renewable energy source based on the forecasted meteorological parameter.

11. A power system comprising:
a renewable energy source;
one or more switching components coupled between the renewable energy source and a power grid, the one or more switching components configured to selectively control and condition a flow of power from the renewable energy source to the power grid; and
a prediction and optimization system configured to optimize power grid operations and enhance a life of the switching components through meteorological parameter forecasting, the prediction and optimization system comprising a processor configured to execute:
a collecting module for collecting meteorological information of a region of operation of the power grid, along with historical meteorological data of the region;
an executing engine for executing a plurality of prediction models using the meteorological information and the historical meteorological data;
a forecasting module for forecasting a meteorological parameter of the region that causes the renewable energy source to generate power, the meteorological parameter being forecast by selectively combining outputs of at least some of the plurality of executed prediction models;
a computing and optimization module for computing optimal switching operations of the switching components based on the forecasted meteorological parameter; and
a controlling module for controlling the switching components of the power grid based on the computed optimal switching operations.

12. The power system of claim 11, wherein the switching components include one or more of load tap changers (LTC), capacitor banks, inverters, converters, solid state transformers, and power electronic components.

13. The power system of claim 11, wherein the plurality of prediction models include two or more of an auto regressive moving average (ARMA) model, auto retrogressive integrating moving average (ARIMA) model, seasonal and trend decomposition (STL) model, linear regression model, exponential regression model, artificial neural network model (ANN), numerical weather forecasting (NWF) model, support vector machine (SVM) model, deep learning model, solar positioning model, and naive prediction model.

14. The power system of claim 11, wherein the renewable energy source comprises one or more photovoltaic (PV) arrays, wherein the forecasted meteorological parameter comprises solar irradiance, and the historical meteorological data of the region comprising observed solar irradiance of the region and extra-terrestrial solar irradiance of the region.

15. The power system of claim 11, wherein the processor executes the computing and optimization module for optimizing the power grid to maintain a specified voltage profile and power factor.

16. The power system of claim 11, wherein the processor executes the forecasting module for forecasting the meteorological parameter of the region by ensembling the outputs of the at least some of the plurality of executed prediction models.

17. The power system of claim 11, wherein the processor executes the forecasting module for predicting an expected power provided by the renewable energy source based on the forecasted meteorological parameter.

18. A system for comprising:
a computer readable storage medium having computer readable code stored thereon that, when executed by a processor, causes the processor to:
collect meteorological information of a region of operation of a power grid, along with historical meteorological data of the region;
execute an Integrated Volt/VAR Control (IVVC) algorithm using the meteorological information and the historical meteorological data, the IVVC algorithm executing a plurality of prediction models;
forecast a meteorological parameter of the region that causes a renewable power source to generate power based on the IVVC algorithm;
compute optimal switching operations in one or more voltage ampere reactive (VAR) compensation devices based on the forecasted meteorological parameter; and
control switching in the one or more VAR compensation devices based on the computed optimal switching operations.

19. The system of claim 18 wherein the meteorological parameter of the region that causes the renewable power source to generate power comprises solar irradiance.

20. The system of claim 18 wherein the VAR compensation devices include one or more of: one or more load tap changers (LTC), one or more capacitor banks, one or more inverters, one or more converters, one or more solid state transformers, and one or more power electronic components.

21. The system of claim 18 wherein the plurality of prediction models include two or more of an auto regressive moving average (ARMA) model, auto retrogressive integrating moving average (ARIMA) model, seasonal and trend decomposition (STL) model, linear regression model, exponential regression model, artificial neural network model (ANN), numerical weather forecasting (NWF) model, support vector machine (SVM) model, deep learning model, solar positioning model, and naive prediction model.

22. A method of optimizing power grid operations and enhancing the life of switching components in a power grid that includes a renewable energy source, the renewable energy source comprising one or more photovoltaic (PV) array, and the method performed by a prediction and optimization system, with the method comprising:
collecting current meteorological information of a region of operation of the power grid during operation of the power grid, along with historical meteorological data of the region, the historical meteorological data comprising historical data of observed solar irradiance of the region and extra-terrestrial solar irradiance of the region;
executing a plurality of prediction models using at least one of the current meteorological information, the historical data of observed solar irradiance, and the extra-terrestrial solar irradiance;
forecasting a meteorological parameter of the region by selectively combining outputs of at least some of the plurality of executed prediction models, the forecasted meteorological parameter comprising solar irradiance;
computing optimal switching operations of the switching components based on the forecasted meteorological parameter; and
controlling the switching components of the power grid based on the computed optimal switching operations.

* * * * *